United States Patent [19]

Shambayati

[11] Patent Number: 5,576,498
[45] Date of Patent: Nov. 19, 1996

[54] LAMINAR FLOW ELEMENT FOR A FLOWMETER

[75] Inventor: Ali Shambayati, Tucson, Ariz.

[73] Assignee: The Rosaen Company, Hazel Park, Mich.

[21] Appl. No.: 551,371

[22] Filed: Nov. 1, 1995

[51] Int. Cl.$^6$ ................................................. G01F 1/37
[52] U.S. Cl. .................................... 73/861.52; 73/202.5
[58] Field of Search .......................... 73/861.52, 861.22, 73/202, 203, 202.5

[56] References Cited

U.S. PATENT DOCUMENTS

| | | | |
|---|---|---|---|
| 1,559,547 | 11/1925 | Brown | 138/44 |
| 1,870,849 | 8/1932 | Hodgson | 138/37 |
| 2,729,976 | 1/1956 | Laub | 73/204 |
| 3,037,384 | 6/1962 | Good | 73/211 |
| 3,071,001 | 1/1963 | Goldsmith | 73/211 |
| 3,071,160 | 1/1963 | Weichbrod | 138/40 |
| 3,240,233 | 3/1966 | Johnston | 138/103 |
| 3,321,970 | 5/1967 | Walker, Sr. et al. | 73/211 |
| 3,443,434 | 5/1969 | Baker et al. | 73/202 |
| 3,514,074 | 5/1970 | Self | 251/127 |
| 3,559,482 | 2/1971 | Baker et al. | 73/204 |
| 3,613,448 | 10/1971 | Benson et al. | 73/205 R |
| 3,792,609 | 2/1974 | Blair et al. | 73/205 R |
| 3,838,598 | 10/1974 | Tompkins | 73/205 L |
| 3,851,520 | 12/1974 | Schluter et al. | 73/23 |
| 3,851,526 | 12/1974 | Drexel | 73/202 |
| 3,917,222 | 11/1975 | Kay et al. | 251/127 |
| 3,938,384 | 2/1976 | Blair | 73/204 |
| 4,118,973 | 10/1978 | Tucker et al. | 73/55 |
| 4,312,236 | 1/1982 | Mahany et al. | 73/861.22 |
| 4,427,030 | 1/1984 | Jouwsma | 138/42 |
| 4,450,718 | 5/1984 | Hartemink | 73/202 |
| 4,461,173 | 7/1984 | Olin | 73/202 |
| 4,487,062 | 12/1984 | Olin et al. | 73/202 |
| 4,497,202 | 2/1985 | Marmelstein | 73/202 |
| 4,522,058 | 6/1985 | Ewing | 73/202 |
| 4,524,616 | 6/1985 | Drexel et al. | 73/203 |
| 4,800,754 | 1/1989 | Korpi | 73/202 |
| 5,297,427 | 3/1994 | Shambayati | 73/203 |

*Primary Examiner*—Richard Chilcot
*Assistant Examiner*—Jewel V. Artis
*Attorney, Agent, or Firm*—Lyon, P.C.

[57] ABSTRACT

A precision laminar flow element for use in mass and volumetric fluid flowmeters is disclosed. The flow element comprises a single or a plurality of wire-wound plates positioned in the flow path. The flow through the laminar flow element results in a pressure drop across the element that is linearly proportional to the flow rate. Pressure measurement holes are positioned at some distance from the inlet and outlet of the flow element where laminar flow is fully developed. Full scale flow rate of the flowmeter can be varied by stacking more than one wire-wound flow element, resulting in a series of instruments capable of measuring a wide range of flow. The symmetrical design of the laminar flow element enables bi-directional flow measurement.

4 Claims, 4 Drawing Sheets

LAMINAR FLOW ELEMENT FOR A FLOWMETER

BACKGROUND OF THE INVENTION

The present invention relates generally to meters for measuring the flow of a fluid through a conduit comprising a laminar flow element for developing a pressure differential across a sensor that varies in accordance with fluid flow in the conduit and more particularly to a wide-range fluid flow measuring device comprising a laminar flow element which maintains low Reynolds numbers through a wide flow and pressure range.

Laminar flowmeters use the linear relationship between the fluid flow rate and static pressure drop or heat transfer. The criteria for the mechanical design of a flow restriction that creates and maintains laminar flow through a measuring device is based on studies conducted by Osborne Reynolds in 1883 relating to fluid flow properties through pipes of different diameter as well as the determination of boundary layers where the transition between laminar flow to turbulent flow occurs. The regimes where laminar or turbulent flow prevails are prescribed by a dimensionless parameter known as the Reynolds number, defined as $D_\rho V/\mu$, where V is the mean velocity of the fluid, D is the characteristic linear dimension of the pipe, $\rho$ is the fluid density, and $\mu$ is the absolute viscosity of the fluid. Generally, laminar flow occurs at Reynolds numbers of less than 2,000, but in practice Reynolds numbers of less than 1,000 are used to ensure laminar flow under all conditions (e.g., viscosity and density variations with temperature).

Once the above condition is met, the advantages of laminar flow can be utilized in providing a flowmeter that has a wider range of operation than non-linear flowmeters. The linear relationship that exists between pressure drop and flow rate can be utilized by both pressure-type and thermal-type flowmeters.

Typically, flowmeters employ a laminar flow element to develop a pressure drop in a shunt path around the laminar flow element thereby to effect flow measurement.

One example of such device is disclosed in U.S. Pat. No. 3,838,598 issued to Tompkins. Tompkins teaches the use of plurality of capillaries to create laminar flow through the measuring device and the use of differential static pressure information to calculate the volumetric flow rate. Certain drawbacks exist with respect to such design. In order to provide flowmeters that have different full scale flow rates, different laminar flow elements must be provided for each flow rate. The capillaries that form the flow passage are also susceptible to clogging if large particles are present in the flow stream. Clogging of the flow capillaries results in a change of pressure across the element for a given flow rate, and thus recalibration of the instrument is necessary.

A different type of laminar flow element of substantially rectangular cross section is proposed in U.S. Pat. No. 4,118,973 issued to Tucker et al. In Tucker, rectangular grooves are machined into plates. By varying the width of the channels and/or by stacking a number of plates, the effective cross section of the flow passage can be varied while low Reynolds numbers are maintained.

Alternative designs are proposed in U.S. Pat. No. 4,497,202 issued to Mermelstein and U.S. Pat. No. 4,427,030 issued to Jouwama. While rectangular laminar flow elements are relatively easy to manufacture and lend themselves to an accommodation of full scale flow rate during assembly, the problem of precision and repeatability remains a difficult task to achieve.

Moreover, Baker, et al, U.S. Pat. No. 3,443,434, entitled "Fluid Flow Measuring Apparatus," discloses a flow measuring device comprising a restrictive element that is interposed in a main line to develop a differential pressure therein. A heated shunt path is connected around the element so as to divert a portion of the fluid from the high pressure side of the restrictive element, through the shunt to the low pressure side of the restrictive element. A thermal transducer is connected in the shunt path to measure the temperature gradient caused by fluid flow through the heated shunt circuit. Temperature variations sensed by the transducer provide an indication of mass flow in the shunt path which is a small but precise fraction of the total flow in the main line.

Weichbrod, U.S. Pat. No. 3,071,160 discloses a laminar flow element exhibiting a linear pressure drop related to flow rate. The element comprises smooth flat sheets and rectangularly indented sheets laid together in pairs to develop slots of a thickness smaller than the width. Specifically, the flow channels are of substantially uniform depth in the range of 0.002 to 0.100 inch and of a width at least ten times the depth. The paired sheets are spirally wound upon mandrel to a desired diameter.

The problem associated with all such known laminar flow elements is that metering of different fluids and flow rates requires a change in area of the laminar flow element which is relatively expensive in that significant tooling is involved.

Moreover, precision laminar flow elements have heretofore been difficult to manufacture because their critical dimensions must be maintained at tight tolerances. In the case of flow elements of rectangular cross section, the critical dimension is the depth of the channel. Pressure drop across a rectangular laminar flow element changes with the third power of the depth. This means that a change of 10% in the depth of a channel that is 0.010" deep results in about 30% change in pressure drop for the same flow rate.

Consistent pressure drop across similar flow elements is an important requirement for mass production of a device. It greatly reduces the amount of time that is required for calibration of the device and results in repeatable and identical performance of different units. One example in which such repeatability is required is in systems where wide changes in flow impedance can adversely affect constant flow maintenance due to limitations of the pump. Replacement of a flowmeter in such a system should produce very little effect, if any, in the flow rate without changing the pump settings. While the inconsistency in producing identical pressure drop can be adjusted electronically to produce the same level of output signal, higher noise levels and the difficulty associated with zero stability of most sensors dictate a somewhat limited range of amplifier gains.

Mechanical adjustment of a laminar flow element for producing equal pressure drop for identical units is preferred over electronic output adjustment for the reasons presented above. One example of such adjustment means is disclosed in my U.S. Pat. No. 5,297,427. In this design, an adjustment screw moves a plate inside a rectangular flow channel, changing the effective width of the flow passage. Another such example is disclosed by Drexel in U.S. Pat. No. 4,524,616, where an adjustment screw moves a frustoconical flow element inside a mating bore.

While mechanical adjustment of a laminar flow element may be practical for producing consistent pressure drops, the high cost of manufacturing such devices may be prohibitive in the highly competitive low cost flowmeter market. The number of components involved in adjustable flow elements as well as the time spent on adjusting the element during calibration substantially increases the cost of such flowmeters.

The aforementioned problems associated with the production of precision laminar flow elements emphasizes the need for a rugged, low cost, precision flow element. Accordingly, the broad object of the present invention is a precision laminar flow element that can be mass produced at relatively low cost.

Another object of the present invention is a laminar flow element that exhibits repeatability of pressure drop without the need for mechanical adjustment.

Yet another object of the invention to provide a simple method of producing a series of different laminar flow elements covering a wide range of full scale flow rates, while maintaining the same full scale pressure drop for use with identical electronic circuit settings.

SUMMARY OF THE INVENTION

A laminar flow element in accordance with a preferred and constructed embodiment of the present invention comprises a carrier plate upon which a wire of precise and easily controlled diameter is wound. Side plates are disposed on opposite sides of the carrier plate. Accordingly, spacing of the side plates from the carrier plate is controlled by the wire diameter. Thus, the critical parameter of the laminar flow element, namely, cross sectional area of the laminar flow path, can be changed by merely changing the wire on the carrier plate.

Specifically, solid metal wires are wound around flat plates to produce channels of rectangular cross section for fluid passage. Precision wire gauges have long been established in the industry. For example, the diameter of a 30 gauge wire is 0.0100" while that of a 28 gauge wire is 0.0126". These diameters are very consistent for a given gauge, and a tolerance of better that +/−0.0002" for 30 gauge wires is easily achievable.

By using wires to maintain the depth of a laminar flow channel, one can obtain very consistent results in producing similar pressure drops for similar elements. The third power dependency of pressure drop versus channel depth results in no more than a few percent variation between different elements.

Wire-wound laminar flow elements can be stacked to produce a larger effective flow passage area, thus allowing for different full scale flow rates. For example, individual flow elements can be separated by solid plates in such a manner that the pressure drop created at 20 liters per minute with one element is the same as that created at 40 liters per minute with two elements. The stacked plates can be secured together to form one module for ease of handling.

In practice, pressure measurement holes are placed in the wire-wound plates some distance from the inlet and outlet, where laminar flow is fully established. In one embodiment, the stacked plates are identical and therefore the pressure measurement holes thereof are aligned, providing means for measuring average static pressure drop across all the channels.

In an alternative construction, the holes can be placed only in the top plate, where the pressure sensing device is exposed to the fluid. In this case the pressure drop measured across the top plate is representative of the flow rate through all the channels. Since flow through all the channels is laminar, the portion of the fluid that is diverted through the different channels remains at constant ratio to that flowing through the top plate for all flow rates up to full scale.

BRIEF DESCRIPTION OF THE DRAWINGS

The preferred embodiment is best understood by reference to the accompanying drawings, wherein.

DETAILED DESCRIPTION OF THE PREFERRED EMBODIMENT(S)

Figure 1:
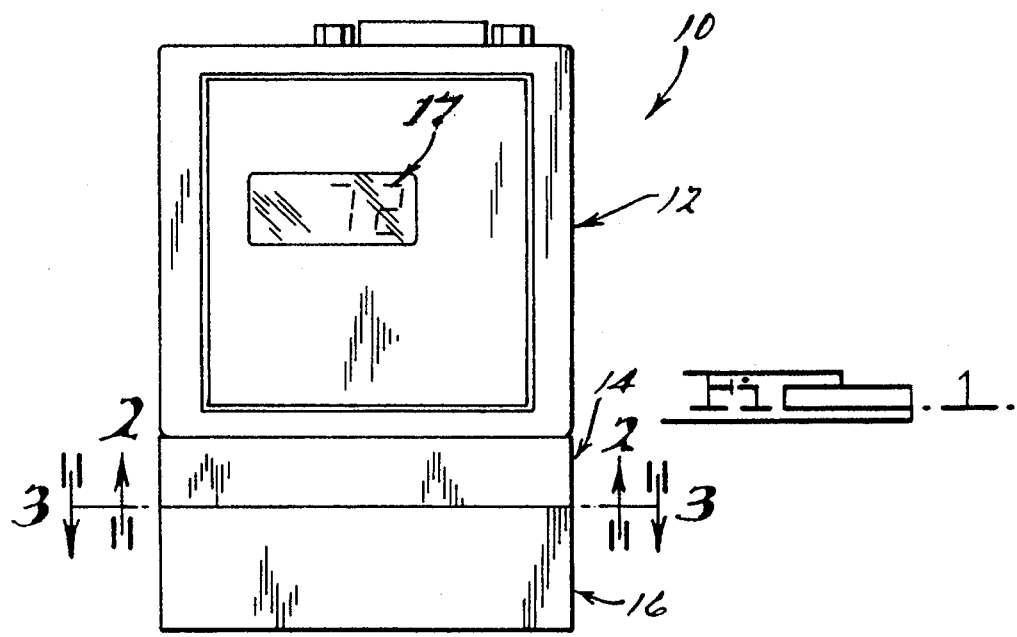
FIG. 1 is an elevational view of a flowmeter in accordance with a preferred embodiment of the invention.

Referring to FIG. 1, a flow meter 10 comprises an electronic sensing and display module 12, a transition module 14, and a laminar flow module 16. The display module 12 indicates the rate of fluid flow through the flowmeter 10 by digital indicia 17.

Figure 2:
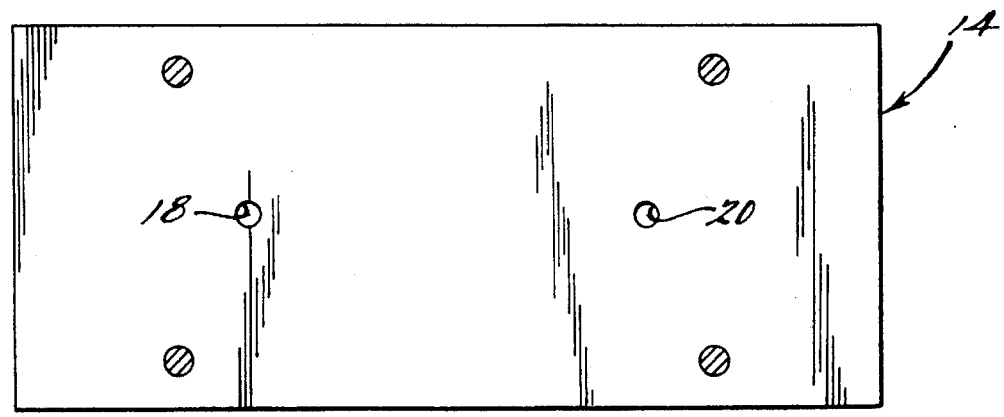
FIG. 2 is a view taken along the line 2—2 of FIG. 1.

As seen in FIG. 2, the transition module 14 has a pair of spaced passages 18 and 20 for diverting a portion of the fluid flowing through the laminar flow module 16 to and from the display module 12. Only a relatively small fraction of total flow in the laminar flow module 16 is diverted through the passages 18 and 20. Passages 18 and 20 are isolated from one another by a gasket 22 that is interposed between the laminar flow module 16 and transition module 14. The gasket 22 has a pair of apertures 24 and 26 therein which communicate with the passages 18 and 20, respectively.

Figure 3:
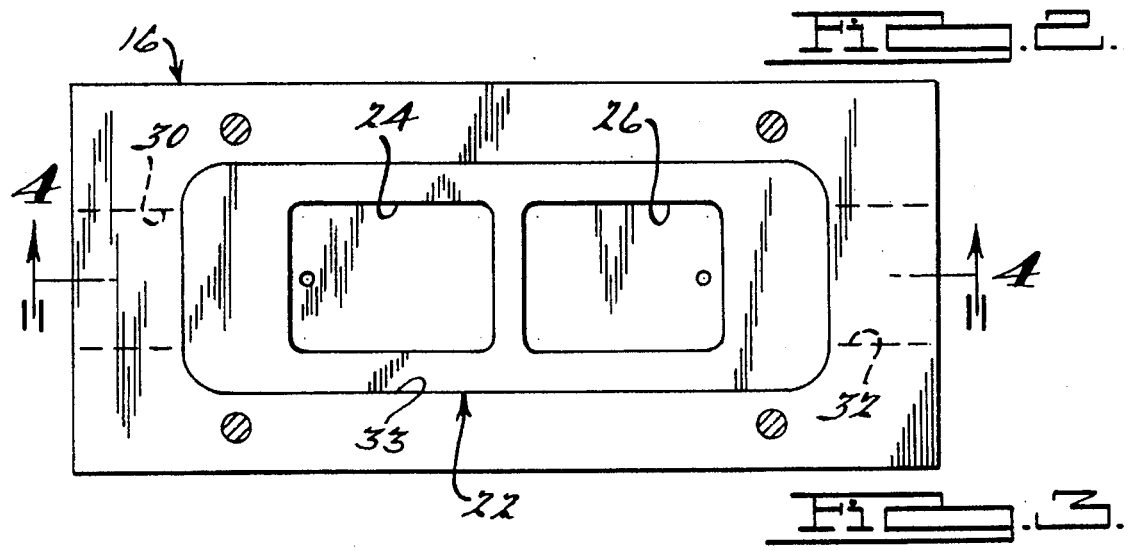
FIG. 3 is a view taken along the line 3—3 of FIG. 1.
Figure 4:
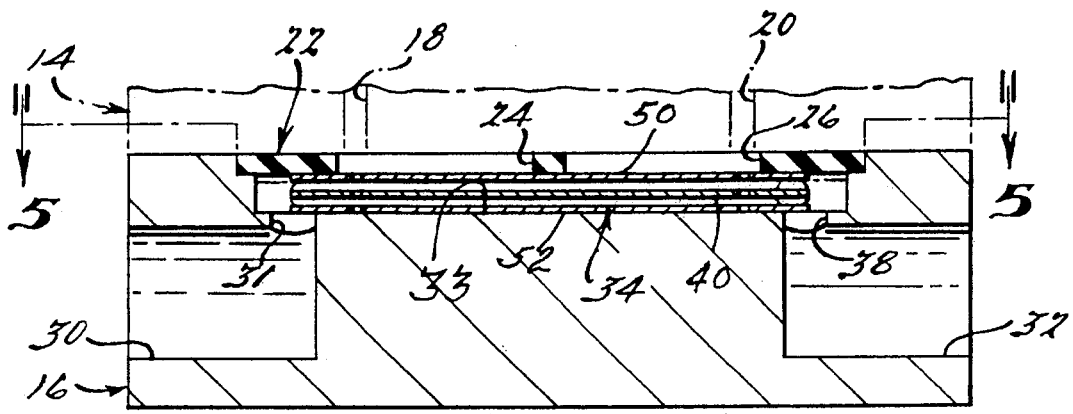
FIG. 4 is a view taken along the line 4—4 of FIG. 3.
Figure 5:
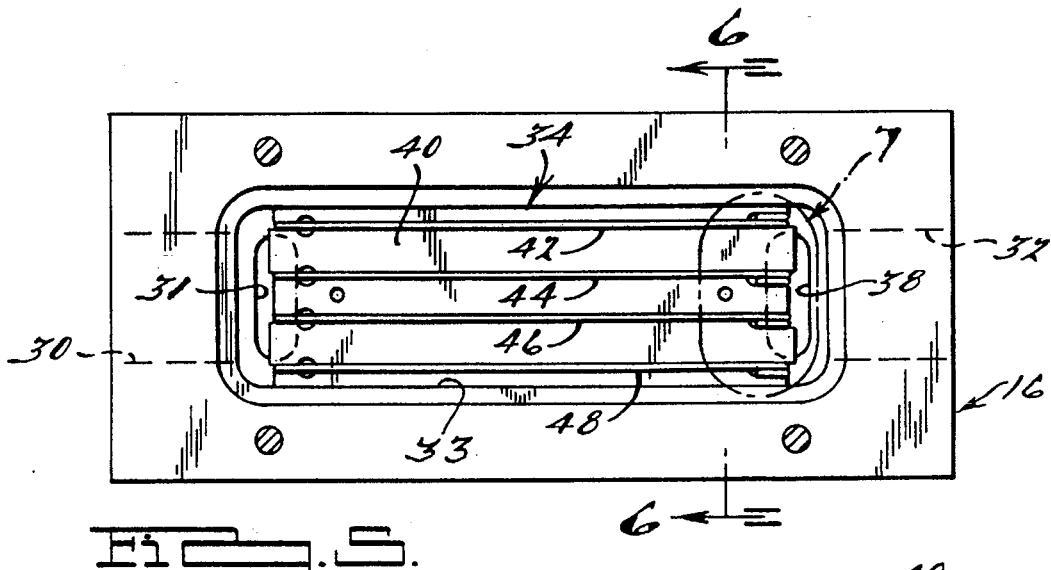
FIG. 5 is a view taken along the line 5—5 of FIG. 4.
Figure 6:
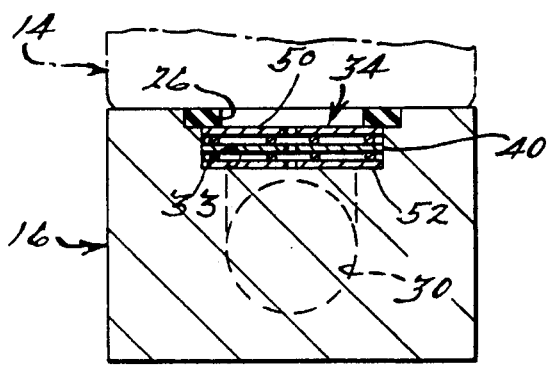
FIG. 6 is a view taken along the line 6—6 of FIG. 5.
Figure 7:
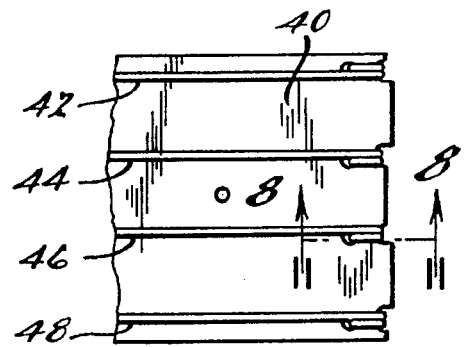
FIG. 7 is a fragmentary view taken within the circle "7" of FIG. 6.

As best seen in FIGS. 3, 4, and 5, the laminar flow module 16 is provided with a fluid inlet 30 and a fluid outlet 32 for connection of the transducer 10 to a fluid source and to apparatus utilizing such flow, not shown. Fluid entering the module 16 through the port 30 is transported vertically upwardly by a passage 31 to a cavity 33 thence longitudinally through a laminar flow element 34, thence downwardly through a passage 38 to the exit port 32.

Figure 8:
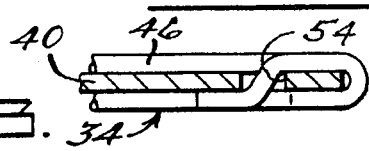
FIG. 8 is a view taken along the line 8—8 of FIG. 7.
Figure 9:
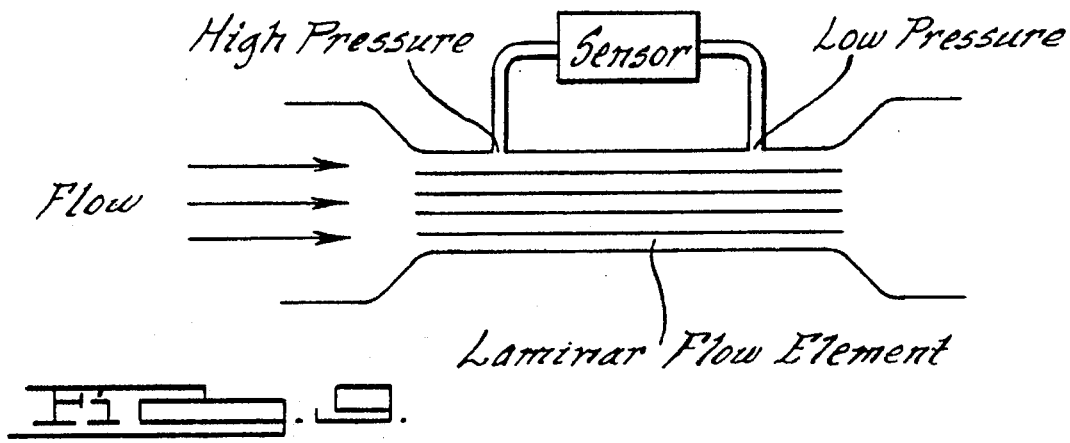
FIG. 9 is a schematic representation of a volumetric laminar flowmeter.

As best seen in FIGS. 4 through 8, the laminar flow element 34 comprises a carrier plate 40 having a plurality of wires 42, 44, 46 and 48, wound thereabout that effect spacing of a top plate 50 and a bottom plate 52 from the carrier plate 40. The wires 42 through 48 are secured in complimentary notches in the carrier plate 40, opposite end portions of each of the wires 42 through 48 being wound about the carrier plate 40 and thereafter secured by, for example, reentry of an end portion through an aperture spaced from the end of the carrier plate 40, one of which is best seen in FIG. 8 and designated by the numeral 54.

Figure 10:
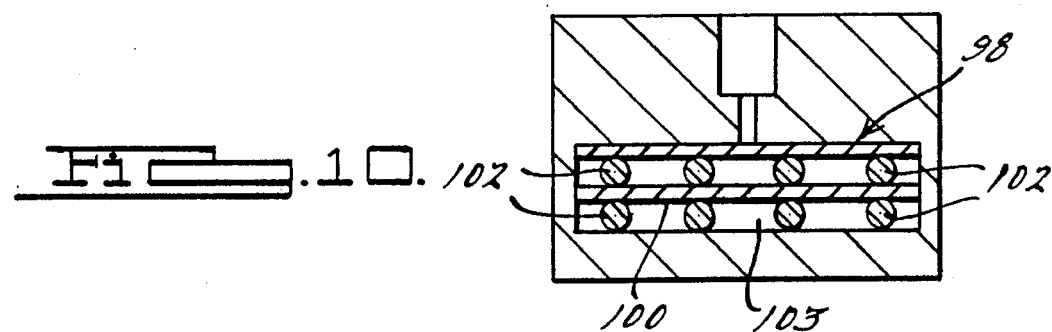
FIG. 10 is a cross-sectional view of the fluid entry section of another embodiment of the present invention.
Figure 11:
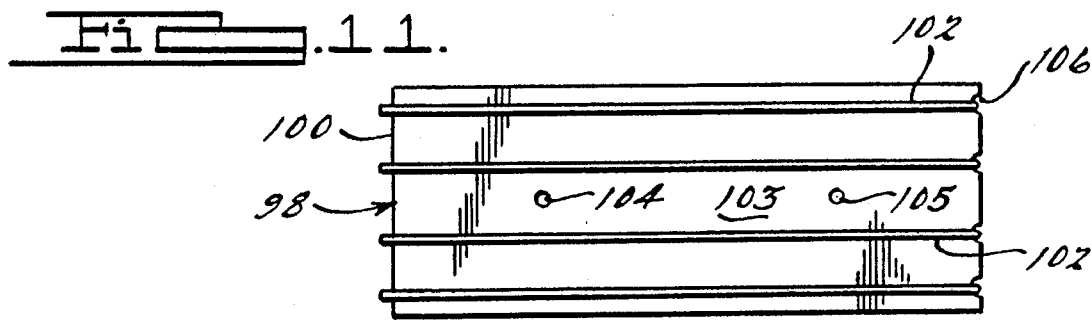
FIG. 11 shows a top view of the laminar flow element of FIG. 10.

Referring to FIG. 10, another embodiment of the invention comprises a laminar flow element 98 comprises a plate 100, upon which a wire 102 is wound so as to act as a spacer to define flow channels 103 along the length of the plate 100. Pressure measurement is performed between apertures 104 and 105 which are located in an area of laminar flow within the channel 103. Wires 102 are positioned by wire guide notches 106.

Figure 12:
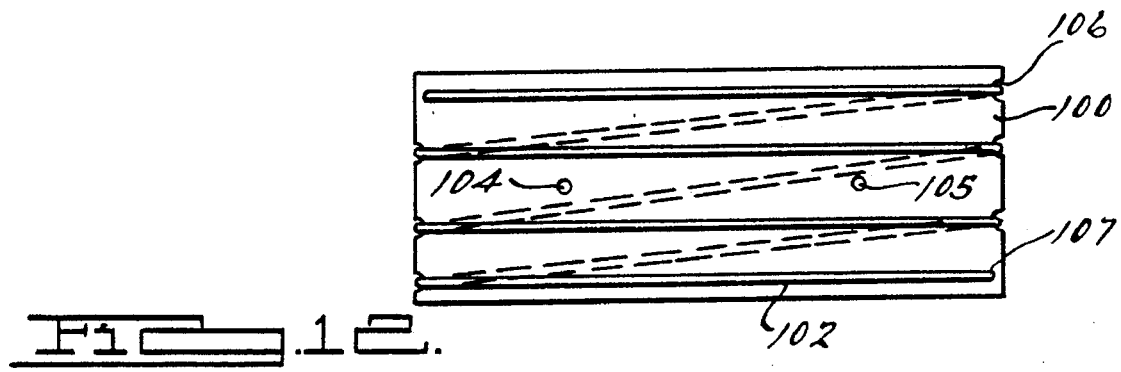
FIG. 12 shows a top view of a different embodiment of the laminar flow element of the present invention.

FIG. 12 illustrates an alternate method of winding the wire 102 about the plate 100 whereby only a single piece of wire 102 is wound around the plate 100. One end of the wire 102 is secured in a start hole 107, thence wound around the plate 100 through the wire guide notches 106, and secured at the opposite end through an end hole 107. Using this technique, the wire 102 runs parallel to the edges of the plate 100 on one side, and diagonally on the other side.

Figure 13:
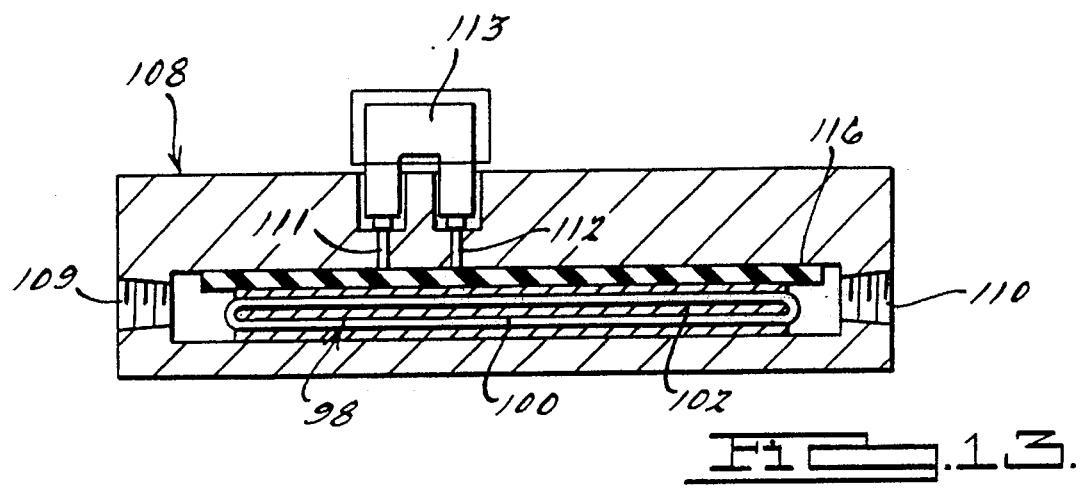
FIG. 13 shows an example of the present invention used with a differential pressure transducer to determine volumetric flow rate.

FIG. 13 illustrates one type of volumetric flowmeter that uses the present invention. The laminar flow element 98 is enclosed within a module 108. Fluid enters the module 108 through an inlet 109 can, flows through the flow channels 103 defined by the wires 102, then exits through an outlet 110. Pressure ports 111 and 112 extend laterally of the module 108 to a differential pressure sensor 113. A gasket 116 insures that the pressure ports 111 and 112 are properly connected to the differential pressure sensor 113.

In a specific application, the wire 102 is 30 gauge. Accordingly, the depth of each flow channel 102 is 0.0100". A typical flow element may have an overall length of 2.000", a width of 0.800", with pressure taps 111 and 112 placed 1.000" apart along the length of the plate 100. This arrangement results in 18" water column pressure drop between pressure taps with flow at the rate of 20 liters per minute. The Reynolds number for air at full scale flow rate is approximately 1,300 in the above configuration.

If higher full scale flow rate is required, a plurality of laminar flow elements 98 can be stacked in parallel to allow for a larger effective flow passage. For example, use of two flow elements having the above dimensions will result in the same pressure drop and Reynolds number at a flow rate of 40 liters per minute.

Figure 14:
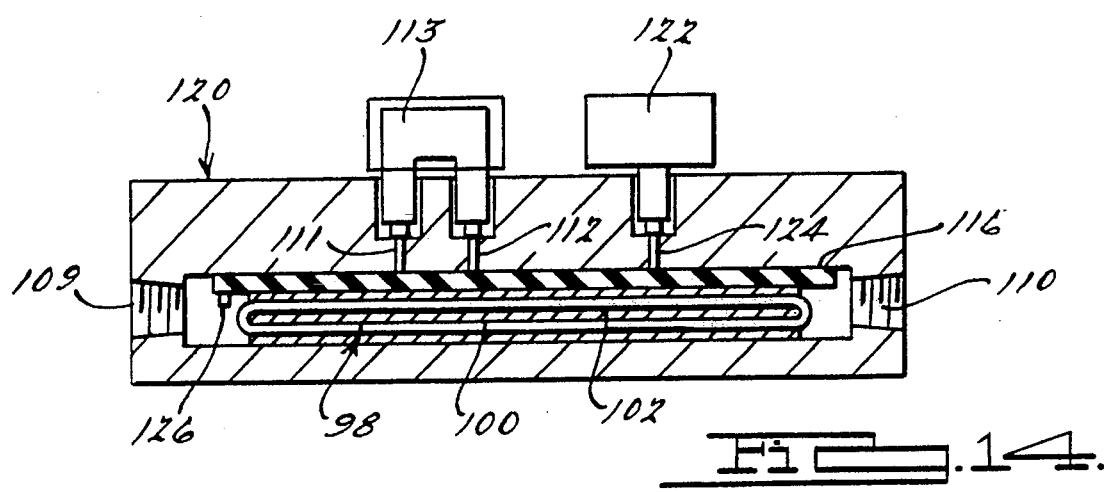
FIG. 14 shows the example of FIG. 13 along with an absolute pressure transducer and temperature sensor to measure mass flow of gases.

FIG. 14 illustrates a mass flowmeter 120 where an absolute pressure sensor 122 is added to sense the line pressure at auxiliary pressure port 124. An absolute temperature sensor 126 is also added to measure fluid temperature. Using the outputs of the three sensors, one can calculate mass flow rate of the fluid.

Figure 15:
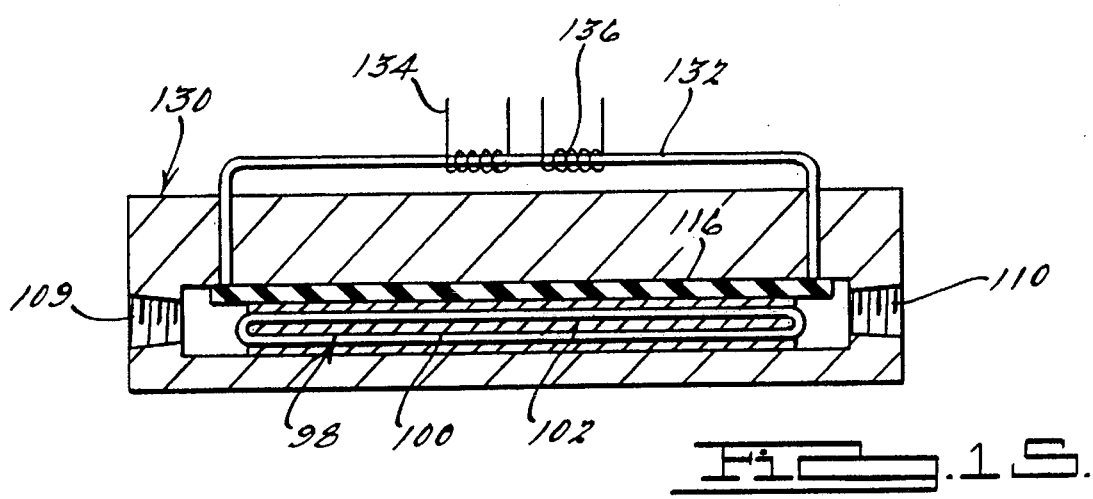
FIG. 15 shows the present invention used with thermal mass flow sensors.

FIG. 15 illustrates a typical thermal tube mass flowmeter 130 in which flow measurement is performed on a small sample of the fluid flowing through a sensor tube 118 by heating the fluid via heater element 119 and measuring the fluid temperature via sensor element 120. The total flow rate is determined by the ratio of the amount of fluid bypassed through the sensor tube 132 as related to the flow through the laminar flow element 98.

While the preferred embodiment of the invention has been disclosed, it should be appreciated that the invention is susceptible of modification without departing from the scope of the following claims.

I claim:

1. In a fluid flowmeter comprising a housing having an internal cavity, a fluid inlet at one end of the cavity, a fluid outlet at the other end of the cavity, and flow sensing means communicating with the cavity, an improved laminar flow element for establishing laminar flow of fluid between the inlet and outlet of the cavity in said housing comprising:

a flat wire carrier plate; and a wire wound on said plate defining a portion of a laminar flow channel extending between the inlet and outlet of the cavity in said housing, the diameter of the wire defining the depth of said channel.

2. In a fluid flowmeter comprising a housing having an internal cavity, a fluid inlet at one end of the cavity, a fluid outlet at the other end of the cavity, and flow sensing means communicating with the cavity, an improved laminar flow element for establishing laminar flow of fluid between the inlet and outlet of the cavity in said housing comprising:

a flat wire carrier plate; and a plurality of wires wound on said plate extending parallel to one another and defining a portion of a laminar flow channel extending between the inlet and outlet of the cavity in said housing, the diameter of each wire defining the depth of said channel.

3. A laminar flow element in accordance with claim 2 including top and bottom plates disposed on opposite sides of said wire carrier plate, respectively, and defining portions of the laminar flow channel.

4. A laminar flow element in accordance with claim 1 wherein said wire carrier plate has notches at opposite ends thereof for the acceptance and location of said wire.

* * * * *